US011366001B2

(12) United States Patent
Ghattas (10) Patent No.: US 11,366,001 B2
(45) Date of Patent: Jun. 21, 2022

(54) FLUID LEVEL SENSOR, FLUID RESERVIOUR, AND METHODS FOR SENSING A FLUID LEVEL

(71) Applicant: PRATT & WHITNEY CANADA CORP., Longueuil (CA)

(72) Inventor: Andrew Ghattas, La Prairie (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 206 days.

(21) Appl. No.: 16/242,545

(22) Filed: Jan. 8, 2019

(65) Prior Publication Data

US 2020/0217707 A1 Jul. 9, 2020

(51) Int. Cl.
*G01F 23/74* (2006.01)
*G01F 23/80* (2022.01)
*H01H 36/02* (2006.01)

(52) U.S. Cl.
CPC ............ *G01F 23/74* (2013.01); *G01F 23/804* (2022.01); *H01H 36/02* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,678,750 A * | 7/1972 | DiNoia | ............... | G01F 23/72 73/313 |
| 3,976,963 A * | 8/1976 | Kubler | ............... | G01D 5/2515 73/313 |
| 4,589,282 A * | 5/1986 | Dumery | ............... | G01F 23/72 73/313 |
| 4,796,472 A * | 1/1989 | Lew | ............... | G01F 23/70 73/313 |
| 4,976,146 A * | 12/1990 | Senghaas | ............... | G01F 23/74 73/308 |
| 5,012,762 A * | 5/1991 | Moskvin | ............... | A01J 5/01 119/14.17 |
| 5,025,827 A * | 6/1991 | Weng | ............... | H01H 36/02 307/118 |
| 5,103,673 A * | 4/1992 | Sawada | ............... | G01F 23/74 73/311 |

(Continued)

FOREIGN PATENT DOCUMENTS

WO 2018144442 8/2018

*Primary Examiner* — Tran M. Tran
(74) *Attorney, Agent, or Firm* — Norton Rose Fulbright Canada LLP (57) ABSTRACT

Herein provided is a fluid level sensor and associated systems and methods. The fluid level sensor comprises a floater movable along a floater path in response to changes in a fluid level and a sensing circuit disposed along the floater path. The floater path has a first end associated with a low fluid level and an opposite second end associated with a high fluid level. The sensing circuit comprises first and second electrically-coupled circuit branches with first and second sensing terminals arranged proximate to the first end of the floater path, a plurality of passive elements connected in series along the first circuit branch, and plurality of switching elements each connected in parallel between the second circuit branch and the first circuit branch at connection points along the first circuit branch between pairs of adjacent passive elements, the switching elements configured for being actuated by movement of the floater.

20 Claims, 5 Drawing Sheets

(56) References Cited

U.S. PATENT DOCUMENTS

| | | | | |
|---|---|---|---|---|
| 5,259,245 A * | 11/1993 | Liu | G01F 23/68 | 73/319 |
| 5,291,031 A * | 3/1994 | MacDonald | G01F 23/68 | 250/577 |
| 5,347,864 A | 9/1994 | Senghaas et al. | | |
| 5,515,890 A | 5/1996 | Koeninger | | |
| 5,627,523 A * | 5/1997 | Besprozvanny | G01F 23/72 | 73/304 R |
| 5,744,701 A * | 4/1998 | Peterson | G01M 3/3245 | 73/40 |
| 5,829,303 A * | 11/1998 | Fraser | G01F 23/72 | 73/319 |
| 6,067,855 A * | 5/2000 | Brown | G01F 23/68 | 73/308 |
| 6,481,278 B1 * | 11/2002 | Kaylor | G01F 23/74 | 73/313 |
| 6,571,626 B1 | 6/2003 | Herford | | |
| 6,588,272 B2 * | 7/2003 | Mulrooney | G01F 23/263 | 73/313 |
| 6,928,862 B1 * | 8/2005 | Robbins | G01F 23/14 | 73/299 |
| 7,343,800 B2 * | 3/2008 | Harman | G01F 23/68 | 73/322.5 |
| 7,360,529 B2 * | 4/2008 | Ziegler | G01F 9/008 | 702/55 |
| 7,513,393 B2 * | 4/2009 | Kotyk | B67D 7/16 | 222/386 |
| 7,562,571 B2 * | 7/2009 | Raffalt | G01F 23/00 | 73/313 |
| 7,730,779 B2 * | 6/2010 | Mahadevaiah | G01F 23/76 | 73/291 |
| 7,992,433 B2 * | 8/2011 | Ziegler | F02D 29/06 | 73/114.54 |
| 8,418,550 B2 * | 4/2013 | Hampton | G05D 9/00 | 73/304 C |
| 8,448,750 B2 * | 5/2013 | Gaugush | G01F 23/74 | 73/313 |
| 8,549,911 B2 * | 10/2013 | Rudd | G01F 23/74 | 73/313 |
| 8,662,168 B2 * | 3/2014 | Levy | G01F 23/268 | 73/64.55 |
| 8,763,455 B1 * | 7/2014 | Chang | G01F 23/72 | 73/311 |
| 8,833,159 B2 * | 9/2014 | D'Angelo | G01F 23/38 | 73/313 |
| 8,933,810 B1 * | 1/2015 | Donehue | G01F 23/74 | 340/618 |
| 9,086,314 B2 * | 7/2015 | Czarnek | G01F 23/68 | |
| 9,151,657 B2 * | 10/2015 | Ross, Jr. | G01F 23/72 | |
| 9,170,144 B2 * | 10/2015 | Qi | G01N 27/123 | |
| 10,156,467 B2 * | 12/2018 | Curry | G01F 23/0046 | |
| 10,254,148 B2 * | 4/2019 | Sala | G01F 23/2967 | |
| 11,035,716 B2 * | 6/2021 | Deak | G01F 23/74 | |
| 2002/0108441 A1 * | 8/2002 | Liu | G01F 23/74 | 73/319 |
| 2005/0109105 A1 * | 5/2005 | Kowalski | G01F 23/74 | 340/623 |
| 2010/0000317 A1 * | 1/2010 | Bron | G01F 23/02 | 73/313 |
| 2010/0307237 A1 * | 12/2010 | Prasad | H01H 36/02 | 73/313 |
| 2012/0138824 A1 * | 6/2012 | Wen | G01F 23/2927 | 250/575 |
| 2015/0355014 A1 * | 12/2015 | Deak | G01F 23/74 | 73/313 |
| 2017/0074715 A1 * | 3/2017 | Bartos | G01F 23/76 | |
| 2019/0301919 A1 * | 10/2019 | Knapp | G01F 23/72 | |
| 2021/0003443 A1 * | 1/2021 | Curry | G01F 23/64 | |

* cited by examiner

FLUID LEVEL SENSOR, FLUID RESERVIOUR, AND METHODS FOR SENSING A FLUID LEVEL

TECHNICAL FIELD

The application relates generally to sensors, and more particularly to liquid level sensors.

BACKGROUND OF THE ART

Fluid level sensors have long been used in a variety of applications, including in various types of vehicles, such as automobiles, ships, and aircraft. As the most common form of fuel for such vehicles is liquid, such as petroleum-based fuel, fluid level sensors are used to provide information regarding a remaining stock of fuel, to avoid fuel shortage situations. In addition to fuel levels, the levels of various other fluids, such as coolant, lubricant, and the like, may also be of interest, and fluid level sensors are often used to inform operators and/or service personnel of remaining quantities of the various fluids, to avoid shortages which in certain situations lead to mechanical failure.

Existing approaches to fluid level sensors can be prone to inaccurate readings or other types of failures. Providing redundant fluid sensors can mitigate some types of failures, but results in increased cost and complexity.

As such, there is room for improvement.

SUMMARY

In accordance with a broad aspect of the invention, there is provided herein a fluid level sensor and associated systems and methods. The fluid level sensor comprises a floater movable along a floater path in response to changes in a fluid level and a sensing circuit disposed along the floater path. The floater path has a first end associated with a low fluid level and an opposite second end associated with a high fluid level. The sensing circuit comprises first and second electrically-coupled circuit branches with first and second sensing terminals arranged proximate to the first end of the floater path, a plurality of passive elements connected in series along the first circuit branch, and plurality of switching elements each connected in parallel between the second circuit branch and the first circuit branch at connection points along the first circuit branch between pairs of adjacent passive elements, the switching elements configured for being actuated by movement of the floater.

In accordance with another broad aspect, there is provided a fluid level sensor, comprising: a floater movable along a floater path in response to changes in a fluid level, the floater path having a first end associated with a low fluid level and an opposite second end associated with a high fluid level; and a sensing circuit disposed along the floater path. The sensing circuit comprises: a first circuit branch extending along the floater path and having a first branch end and a second branch end, the first branch end having a first sensing terminal arranged proximate to the first end of the floater path associated with the low fluid level; a second circuit branch extending along the floater path and having a third branch end and a fourth branch end, the third branch end having a second sensing terminal arranged proximate to the first end of the floater path associated with the low fluid level, the fourth branch end electrically coupled to the second branch end of the first circuit branch and arranged proximate to the second end of the floater path associated with the high fluid level; a plurality of passive elements connected in series along the first circuit branch between the first branch end and the second branch end; and a plurality of switching elements each connected in parallel between the second circuit branch and the first circuit branch at connection points along the first circuit branch between pairs of adjacent passive elements, the switching elements configured for being actuated by movement of the floater.

In some embodiments, the fluid level sensor further comprises first and second sensing leads coupled to the first and second sensing terminals, respectively, and extending toward the second end of the floater path associated with the high fluid level.

In some embodiments, the fluid level sensor further comprises a detector coupled to the first and second sensing terminals for determining the fluid level by sensing an actual value of the passive elements.

In some embodiments, wherein the floater comprises a magnetic element, and wherein the plurality of switching elements are magnetically-switched elements.

In some embodiments, the floater comprises a light-producing element, and wherein the plurality of switching elements are optically-switched elements.

In some embodiments, the plurality of passive elements comprises a plurality of resistors.

In some embodiments, the plurality of passive elements comprises a plurality of capacitors.

In some embodiments, the plurality of passive elements comprises a plurality of inductors.

In some embodiments, the switching elements are closed when proximate to the floater.

In some embodiments, the fluid level sensor further comprises a floater-retaining member, and wherein the sensing circuit is coupled to the floater-retaining member.

In some embodiments, the floater is movable along an outside surface of the floater-retaining member.

In some embodiments, the floater is movable within a hollow cavity formed within the floater-retaining member.

In accordance with a further broad aspect, there is provided a method for sensing a fluid level in a reservoir having a bottom end associated with a low fluid level and a top end associated with a high fluid level, the method comprising: disposing, within the reservoir, a fluid level sensor having a floater and a sensing circuit, the floater movable along a floater path in response to changes in the fluid level, the floater path extending between the bottom end and the top end of the reservoir, the sensing circuit having a plurality of sensing elements extending between the bottom end and the top end of the reservoir and a pair of sensing terminals having a sensing perspective from the bottom end of the reservoir; and sensing the fluid level to measure an actual fluid level or a lower-than actual fluid level when any one of the sensing elements is short-circuited.

In some embodiments, disposing the fluid level sensor within the reservoir comprises retaining the floater within the fluid reservoir with a floater-retaining member.

In some embodiments, retaining the floater within the fluid reservoir with a floater-retaining member comprises retaining the floater within a hollow cavity of the floater-retaining member.

In some embodiments, retaining the floater within the fluid reservoir with a floater-retaining member comprises inserting the floater-retaining member through an axial bore of the floater.

In some embodiments, disposing the fluid level sensor within the reservoir comprises forming the sensing circuit on the floater-retaining member.

In some embodiments, disposing the fluid level sensor within the reservoir comprises forming the sensing circuit on an inner wall of the reservoir.

In some embodiments, the method further comprises electrically coupling a pair of sensing leads to the pair of sensing terminals.

In accordance with a still further embodiment, there is provided a fluid reservoir, comprising: a reservoir structure defining a storage chamber for receiving a fluid and having a top end associated with a high fluid level and a bottom end associated with a low fluid level; and a fluid level sensor disposed within the reservoir structure and having a floater and a sensing circuit, the floater movable along a floater path in response to changes in the fluid level, the floater path extending between the bottom end and the top end of the reservoir, the sensing circuit having a plurality of sensing elements extending between the bottom end and the top end of the reservoir and a pair of sensing terminals having a sensing perspective from the bottom end of the reservoir, wherein the fluid level sensor senses an actual fluid level or a lower-than actual fluid level when any one of the sensing elements is short-circuited.

DESCRIPTION OF THE DRAWINGS

Reference is now made to the accompanying figures in which.

DETAILED DESCRIPTION

A fluid level sensor can be provided in a reservoir to provide information about the quantity of fluid present in the reservoir. The reservoir can be any suitable kind of reservoir, and can be used to store any suitable kind of fluid, including fuels, lubricant, coolant, fluid for consumption, for use in industrial processes, and the like. Depending on the nature of the fluid in the reservoir, the embodiments of fluid level sensors disclosed herein can be packaged in protective casings or otherwise shielded from the fluid using any suitable techniques.

Figure 1:
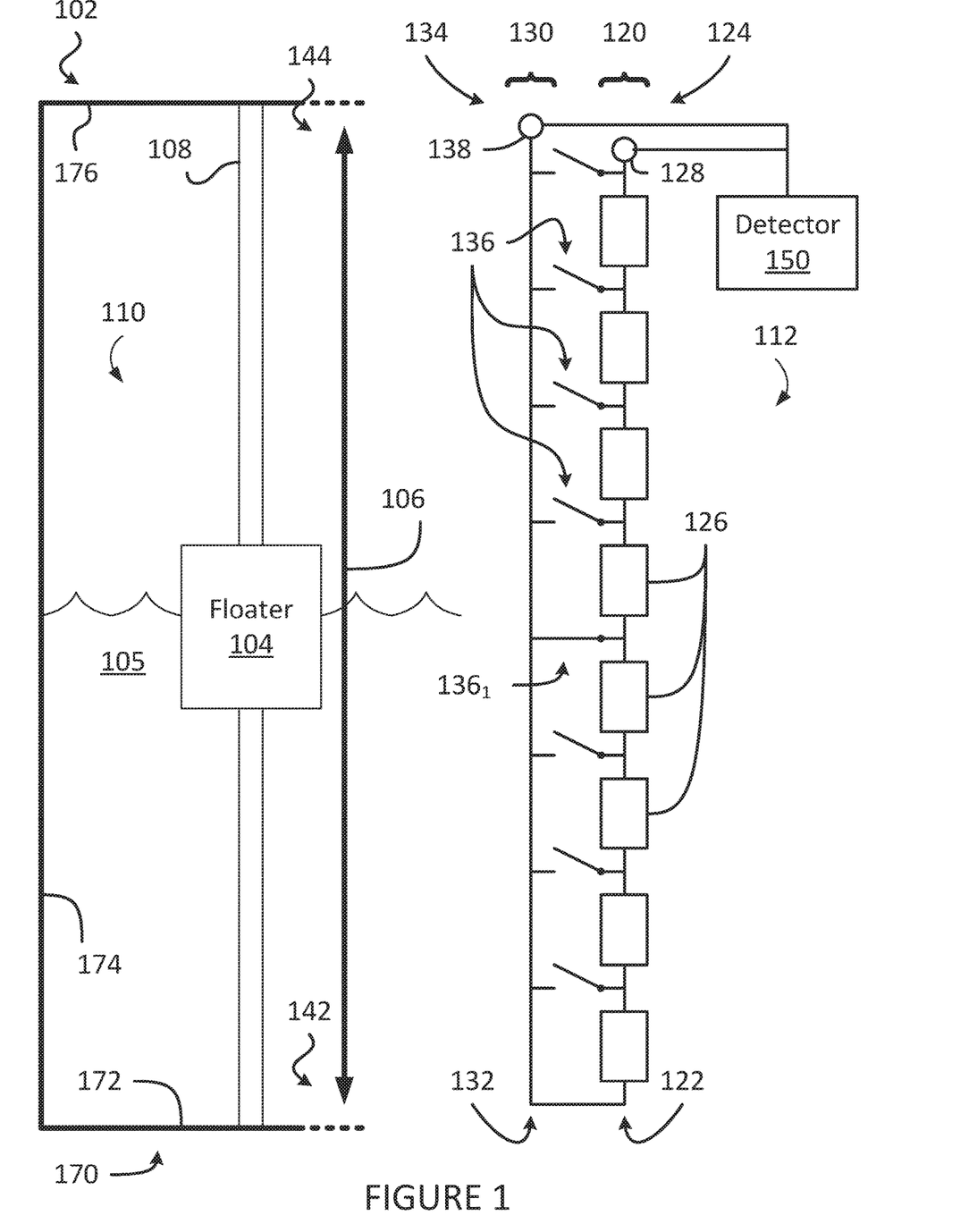
FIG. 1 is a cutaway side elevational view of an example fluid level sensor, in accordance with an illustrative embodiment.

With reference to FIG. 1, there is shown a fluid level sensor 110 disposed in a reservoir 102. The reservoir 102 contains a certain quantity of a fluid 105. The reservoir 102 is formed of a reservoir structure 170, which can have any suitable shape and size, and is formed of at least a bottom surface 172 and a side surface 174. The bottom surface 172 defines a bottom end of the reservoir 102, which is associated with a low level of fluid 105 in the reservoir. The reservoir 102 can also have a top end, associated with a high level of fluid 105 in the reservoir 102, which is substantially opposite the bottom end. In some embodiments, the reservoir structure 170 also has a top surface 176, which defines the top end of the reservoir 102. The side surface 174 can take on any shape or orientation, and can be one of a plurality of side surfaces, as appropriate. The reservoir structure 170 can be spherical, semi-spherical, cylindrical, box-shaped, or take on any suitable shape or size.

The fluid level sensor 110 is composed of a floater 104, which moves along a floater path, illustrated by arrow 106, in response to changes in the quantity of fluid 105 in the reservoir 102, and a sensing circuit 112. The floater path 106 has a first end 142 by the bottom end of the reservoir 102, which is associated with a low level of fluid 105 in the reservoir 102, and a second end 144, which can be by the top end of the reservoir 102 and is associated with a high level of fluid in the reservoir 102. The floater 104 can be disposed within the reservoir 102 in any suitable fashion, and the sensing circuit 112 can be disposed within the reservoir 102, for example on an inner wall of the reservoir 102 defined by the reservoir structure 170 or otherwise inside the reservoir 102, or outside the reservoir 102, for example on an outer wall defined by the reservoir structure 170, or disposed on a separate structure adjacent or proximate the reservoir 102.

The floater 104 can be any suitable device which exhibits buoyancy when placed in the fluid 105. In some embodiments, the floater 104 is hollow, or contains a hollow area, to provide buoyancy. In some embodiments, the floater 102 is a plastic disk. In other embodiments, the floater is a plastic cylinder. Still other types of floaters 104 are considered. In addition, the floater 104 is provided with one or more elements which produce an interaction which can be detected by the sensing circuit 112. In some embodiments, the floater 104 is provided with magnetic elements which produce a magnetic field. In other embodiments, the floater 104 is provided with various electrical elements which produce an electric field. In further embodiments, the floater 104 is provided with optical elements. For example, the floater 104 is provided with light-emitting elements which emit a particular type of light, for instance ultraviolet, visible, or infrared light. In another example, the floater 104 is provided with one or more reflective elements which reflect light provided within the reservoir 102, for example from a light source. Still other types of elements are considered, and in some other embodiments the floater 104 combines a plurality of types of elements.

The sensing circuit 112 is composed of two circuit branches 120, 130. The first circuit branch 120 has a first end 122, disposed proximate the first end 142 of the floater path 106, and a second end 124, disposed proximate the second end 144 of the floater path 106. The first circuit branch 120 is composed of a plurality of passive elements 126 which are connected in series between the first end 122 and the second end 124. The first circuit branch 120 also has a sensing terminal 128, which is arranged on the circuit branch 120 proximate the second end 124 of the circuit branch 120. In this fashion, the sensing terminal 128 is disposed proximate the second end 144 of the floater path 106, which is associated with a high level of the fluid 105.

The passive elements 126 can be any suitable passive element, including resistors, capacitors, inductors, and the like. The passive elements 126 can be of any suitable value: in some embodiments, all of the passive elements 126 are substantially of the same value (e.g., each 100Ω, each 10 μF, each 10 mH, etc.); in other embodiments, the passive elements 126 can be assigned different values. The passive elements 126 can be connected to one another in any suitable fashion, including using a breadboard, on a printed circuit-board, and the like.

The second circuit branch 130 has a first end 132, disposed proximate the first end 142 of the floater path 106, and a second end 134, disposed proximate the second end 144 of the floater path 106. The second circuit branch 120 is composed of a plurality of switching elements 136 which are connected in parallel, between the first end 122 and the second end 124. The second circuit branch 130 also has a sensing terminal 138, which is arranged on the second circuit branch 130 proximate the second end 134 of the second circuit branch 130. In this fashion, the sensing terminal 138 is disposed proximate the second end 144 of the floater path 106, which is associated with a high level of the fluid 105.

The switching elements 136 are also connected to the first circuit branch 120 between pairs of adjacent ones of the passive elements 126. Put differently, each of the switching elements 136 is a two-terminal device, with one terminal of each of the switching elements 136 connected via the second circuit branch 120, and with the other terminal of each of the switching elements 136 connected to the first circuit branch 120 at respective points between pairs of the passive elements 126.

The switching elements 136 can be any device which actuates a switch between an open and a closed state in response to external stimuli. The switching elements 136 can respond to magnetic, electric, optical, or other stimuli, as appropriate, based on the particular stimuli produced by the floater 104. For example, if the floater 104 includes a magnetic element, suitable for producing a magnetic field, the switching elements 136 are magnetically-switched elements, which change their state, for instance from open to closed, when the floater 104 is proximate to the switching elements 136. In another example, the floater 104 includes an optical element producing optical stimuli, and the switching elements 136 include optically-switched elements, for instance based on photodiodes.

The term "sensing element" may be used herein to refer to a combination of one of the passive elements 226 and one of the switching elements 236 which is connected to the first branch proximate the particular passive element 236. Therefore, the sensing circuit 112 can be said to be composed of a plurality of sensing elements. The first and second circuit branches 120, 130 are also linked to one another by connecting the first end 122 of the first circuit branch 120 with the first end 132 of the second circuit branch 130. The first and second circuit branches 120, 130 are thus also connected near the first end 142 of the floater path 106, which is associated with a low level of fluid 105.

In operation, the floater 104 assumes a position indicative of the level of fluid 105 in the reservoir 102. The position of the floater 104 renders it proximate a particular one of the switching elements 136: in the example illustrated in FIG. 1, the floater 104 is proximate switching element $136_1$. The switching element $136_1$ is caused to assume a closed state, different from that of the remainder of the switching elements 136 to which the floater 104 is not proximate, which remain in an open state. Movement of the floater 104 can cause the switching element $136_1$ to become open, and for another one of the switching elements 136 to assume the closed position.

Variation of the state of the switching elements 136, between open and closed, causes the actual value of the passive elements 126 of the sensing circuit 112 to change, due to the changing configuration of the sensing circuit 112. For instance, if the passive elements 126 are resistors, depending on which one of the switching elements 136 is closed, the value of the resistance of the sensing circuit 112 measured across the sensing terminals 128, 138 will vary. As a result, by measuring the actual value of the passive elements 126 of the sensing circuit 112, the level of fluid 105 in the reservoir 102 can be determined. The expression "sensing perspective" is used herein to refer to the position from which measurements at the sensing terminals 128, 138 are performed. In the case of sensing circuit 112, the sensing perspective is disposed near the top end of the reservoir 102, and the sensing perspective of the sensing circuit 112 can be said to be from the top end of the reservoir 102.

A detector 150 can be coupled to the sensing terminals 128, 138 of the first and second circuit branches 120, 130, and can be used to measure the actual value of the passive elements 126, and thus of the level of fluid 105 in the reservoir 102. The detector 105 can be any suitable device, for instance a computer-based device, which can sense the actual value of the passive elements 126 and provide an indication of the level of fluid 105 in the reservoir 102 as a digital signal to a system-level device, or other control device, as appropriate.

In some embodiments, the fluid level sensor 110 further includes a floater-retaining member 108, which is disposed within the reservoir 102 for retaining the floater 104 and, for example, to ensure that motion of the floater 104 occurs substantially along the floater path 106. The floater-retaining member 108 can be coupled to one or both of the bottom surface 172 and the top surface 176. In some embodiments, including the embodiment illustrated in FIG. 1, the floater 104 is provided with an axial bore and the floater-retaining member 108 is an elongated cylindrical axle which can be inserted in the axial bore of the floater 106. The floater 106 is then free to move along the outside surface of the floater-retaining member 108, following the floater path 106. In other embodiments, the floater-retaining member 108 is a hollow cylinder in fluid communication with the reservoir 102 in which the fluid 105 is held so that the fluid 105 is free to enter and exit the floater-retaining member 108 in response to changes in the level of the fluid 105. The floater 104 is disposed within the hollow area of the floater-retaining member 108 and is configured to slidably move within the hollow area of the floater-retaining member 108 along the floater path 106 as the fluid 105 enters and exits the hollow area of the floater-retaining member 108. Still other configurations for the floater-retaining member 108 and the floater 104 are considered. It should be noted that in some embodiments, the floater 104 is free-floating within the reservoir 102, and the floater-retaining member 108 is eschewed.

Figure 2:
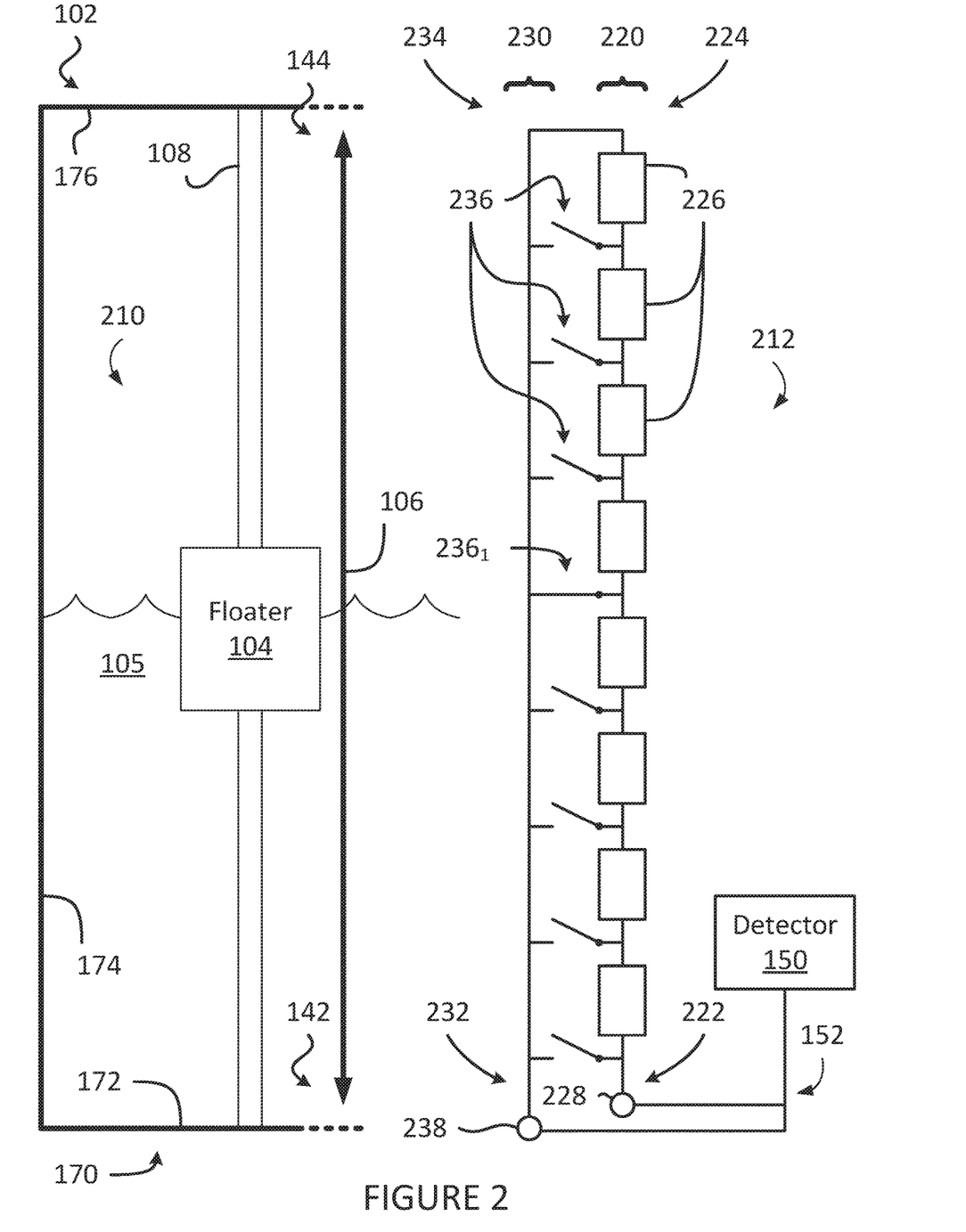
FIG. 2 is a cutaway side elevational view of an example fluid level sensor, in accordance with an illustrative embodiment.

With reference to FIG. 2, another embodiment of a fluid level sensor is illustrated at 210, composed of the floater 104 and a sensing circuit 212. The sensing circuit 212 is composed of branches 220, 230, in which the first branch 220 is formed of series-connected passive elements 226 (which can be substantially similar to the passive elements 126), and in which the second branch is formed of two-terminal switching elements 236 (which can be substantially similar to the switching elements 136), connected together by first terminals of the switching elements 236, and also each connected to the first branch between adjacent pairs of the passive elements 126. The first circuit branch 220 has a first end 222, disposed proximate the first end 142 of the floater path 106, and a second end 224, disposed proximate the second end 144 of the floater path 106. The second circuit branch 230 has a first end 232, disposed proximate the first end 142 of the floater path 106, and a second end 234, disposed proximate the second end 144 of the floater path 106. The first and second branches 220, 230 each define a sensing terminal 228, 238, which, in the fluid level sensor 210, are disposed at respective first ends 222, 232 of the circuit branches 220, 230. In the case of sensing circuit 212, the sensing perspective is disposed near the bottom end of the reservoir 102 (i.e., by the bottom surface 172), and the sensing perspective of the sensing circuit 212 can be said to be from the bottom end of the reservoir 102.

The sensing terminals 228, 238 are therefore disposed near the first end 142 of the floater path 106, which is associated with a low level for the fluid 105, and provide a sensing perspective from the bottom end of the reservoir 102. The detector 150 is coupled to the sensing terminals 228, 238. In some embodiments, the detector 150 can be positioned proximate the sensing terminals 228, 238, for instance near the bottom surface 172 of the reservoir 102 and proximate the first end 142 of the floater path 106. In some embodiments, sensing leads 152, which couple the detector 150 to the sensing terminals 228, 238, can be sufficiently long to couple the sensing terminals 228, 238 to the detector 150 when the detector is positioned near the top surface 174 of the reservoir 102 and proximate the second end 144 of the floater path 106. The detector 150 can alternatively be positioned at any other suitable location relative to the reservoir 102, and the sensing leads 152 can be provided with sufficient length for coupling the detector 150 to the sensing terminals 228, 238, while maintaining the sensing perspective of the sensing terminals 228, 238 near the bottom end of the reservoir 102.

In addition, the first and second branches 220, 230 are coupled together at the second ends 224, 234, thereof, which are proximate the second end 144 of the floater path 106, which is associated with a high level for the fluid 105. The first and second branches 220, 230 can be coupled together via their second ends 224, 234, in any suitable fashion, and using any suitable connecting means.

Figure 3A:
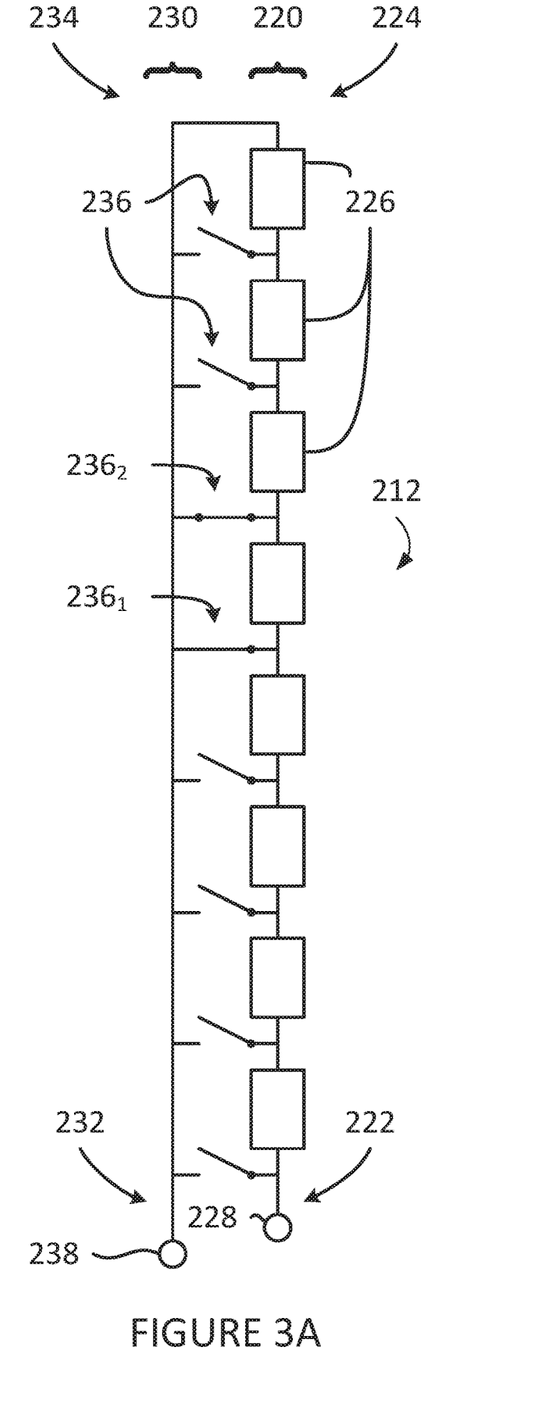
FIGS. 3A-B are side elevational views illustrating example failure modes of the fluid level sensor of FIG. 2, in accordance with an illustrative embodiment.
Figure 3B:
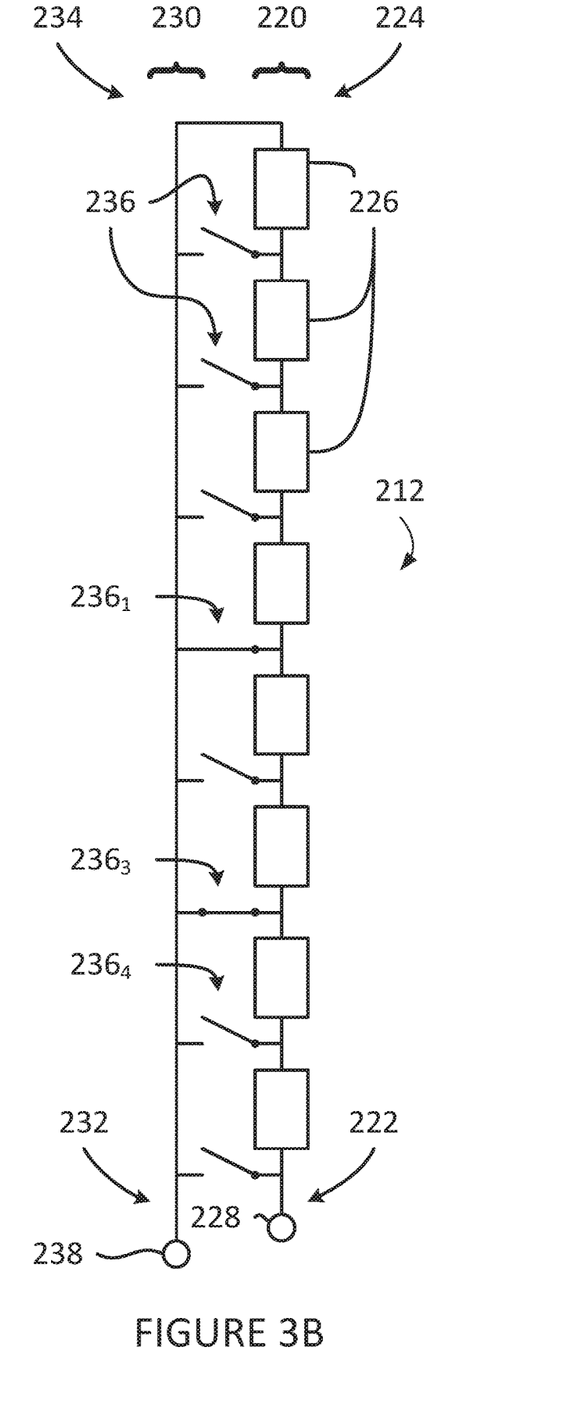

With additional reference to FIGS. 3A and 3B, an example failure mode of the sensing circuit 212 is when a particular one of the switching elements 236 short-circuits: for example, when a particular switching element $236_2$ or $236_3$ assumes a closed position despite the floater 106 not causing the particular switching element $236_2$ or $236_3$ to close. For the examples illustrated in FIGS. 3A and 3B, switching elements $236_1$ will be taken to be the "properly closed" switch, namely the switch caused to be closed by action of the floater 106. Two types of inaccurate measurements of the level of fluid 105 in the reservoir 102 are possible: one in which the level of fluid 105 is underestimated, and one in which the level of fluid 105 is overestimated. When the level of fluid 105 is underestimated, consequences can include early refilling of the reservoir 102 to reduce the risk of emptying the reservoir 102 and/or early preventative maintenance due to consistent lower-than-actual fluid level measurements. Conversely, overestimating the level of fluid 105 can result in severe consequences: if the reservoir 102 provides fuel or lubricant to an engine, overestimating the level of fluid 105 can result in unexpected lack of fuel or catastrophic damage to the engine due to lack of lubricant. Additionally, certain reservoirs 102 have certain minimum levels of fluid 105 below which they do not operate correctly or efficiently. If the level of fluid 105 in the reservoir 102 unknowingly falls below the set minimum levels, the reservoir 102 can stop functioning properly, or result in reduced efficiency of operation.

In FIG. 3A, switching element $236_2$ is short-circuited, which would indicate a fluid level higher than the actual fluid level, indicated by the switching element $236_1$ being closed. In cases in which a short-circuit switching element 236 is indicative of a fluid level higher than the actual fluid level, the configuration of the sensing circuit 212 ensures that the fluid level indicated by the sensing circuit is accurate. As seen from the sensing perspective, the sensing circuit 212 presents as a first circuit loop with four passive elements 226 from the sensing terminals 228, 238 to the switching element $236_1$, and two short-circuited loops, one with one passive element 226 between switching elements $236_1$, $236_2$, and another with three passive elements 226 from switching element $236_2$ to the second branch ends 224, 234. Because the switching elements $236_1$ and $236_2$ are closed, the passive elements 226 above the switching element $236_1$ are shorted and do not contribute to the actual value of the sensing circuit 212. In this fashion, despite the switching element $236_2$ being short-circuited, a reading of the actual value for the passive elements 226 of the sensing circuit 212 will result in a value representative of the actual fluid level in the reservoir 102. Put differently, short-circuited switching elements for fluid levels higher than the actual fluid level do not impact the determination of the actual fluid level in the reservoir 102.

In FIG. 3B, switching element $236_3$ is short-circuited, which would indicate a fluid level lower than the actual fluid level, indicated by the switching element $236_1$ being closed. In cases in which a short-circuit switching element 236 is indicative of a fluid level lower than the actual fluid level, the configuration of the sensing circuit 212 ensures that the fluid level indicated by the sensing circuit is not above the actual fluid level. As seen from the sensing perspective, the sensing circuit 212 presents as a first circuit loop with two passive elements 226 from the sensing terminals 228, 238 to the switching element $236_3$, and two short-circuited loops, one with two passive elements 226 between switching elements $236_3$, $236_1$, and another with four passive elements 226 from switching element $236_1$ to the second branch ends 224, 234. In this case, because the switching elements $236_3$ and $236_1$ are closed, the passive elements 226 above the switching element $236_3$ are shorted and do not contribute to the actual value of the sensing circuit 212. This results in a reading of the actual value for the passive elements 226 of the sensing circuit 212 indicating a fluid level lower than actual.

Therefore, the configuration of the sensing circuit 212, including the positioning of the sensing perspective by having the sensing terminals 228, 238 proximate the end 142 of the floater path 106 associated with a low fluid level in the reservoir 102, results in the short-circuit of the switching element $236_3$ causing an underestimation of the fluid level. As discussed hereinabove, an underestimation of the fluid level can lead to non-severe consequences, such as early refilling of the reservoir 102 and/or preventative maintenance. In addition, the configuration of the sensing circuit 212 ensures that short-circuit failure of any of the switching elements 236 does not result in an overestimation of the level of fluid 105 in the reservoir 102. In this fashion, the configuration of the sensing circuit 212 avoids numerous severe and negative consequences which can result from an overestimation of the level of fluid 105 in the reservoir 102.

In addition, once the fluid level descends below the level at which the floater 106 would actuate the switching element $236_3$, the sensing circuit 212 once again accurately indicates the fluid level, for instance by actuating the switching element $236_4$. The configuration of the sensing circuit 212 of the fluid level sensor 200 ensures that short-circuit failures of the switching elements 236 does not result in an overestimation of the fluid level in the reservoir 102. Instead, because the sensing circuit 212 is sensed from the sensing terminals 228, 238 at the first ends 222, 232 of the circuit branches 220, 230, short-circuited switching elements 236 result in at worst an underestimation of the fluid level in the reservoir 102, and may also result in an accurate sensing of the fluid level, once the fluid level is below the level indicated by the short-circuited switching element 236.

Figure 4:
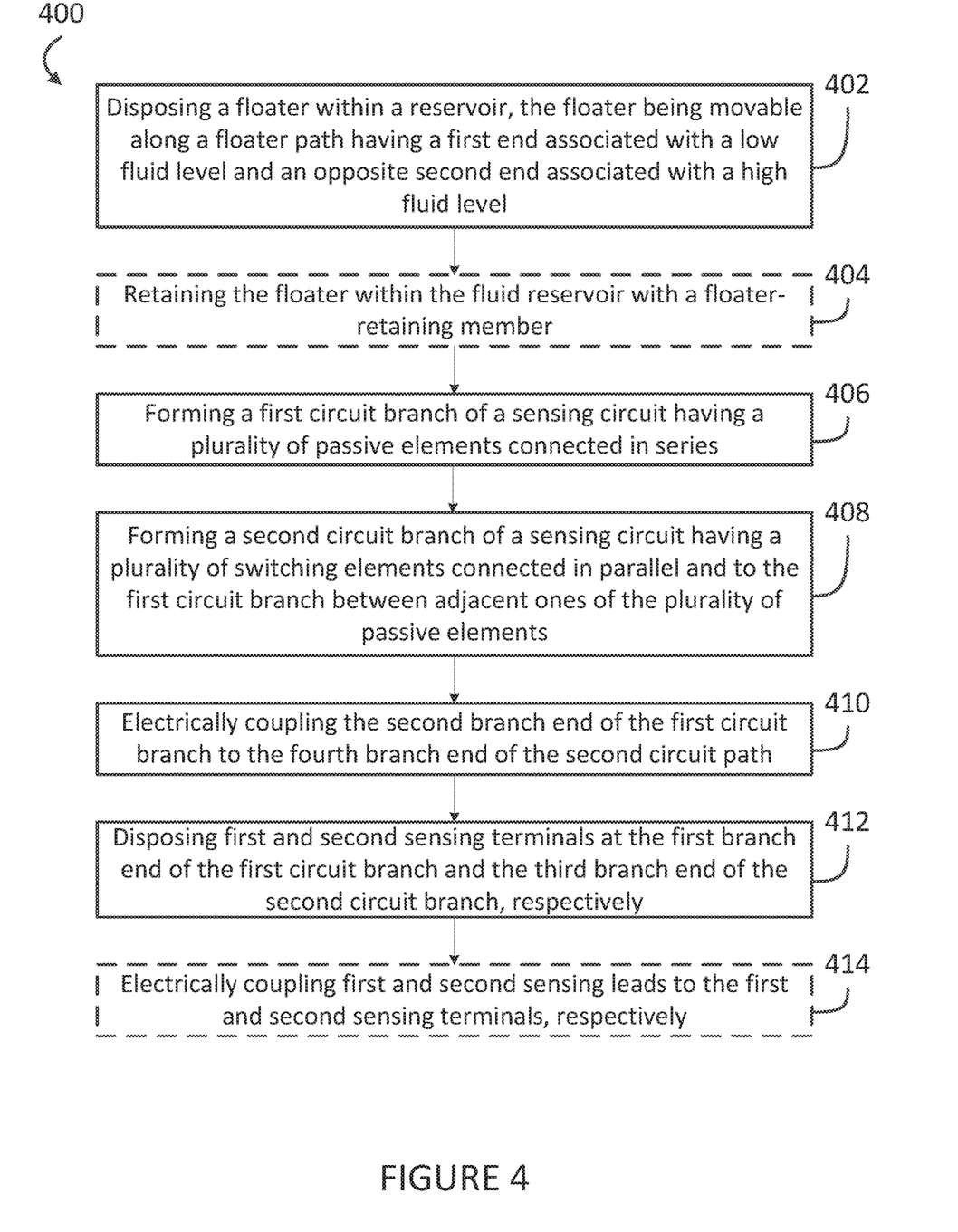
FIG. 4 is a flowchart of an example method for arranging a fluid level sensor in a reservoir, in accordance with an illustrative embodiment.

With reference to FIG. 4, there is illustrated a method 400 for arranging a fluid sensor in a reservoir, for example the fluid level sensor 210 in the reservoir 102. At step 402, a floater is disposed within the reservoir 102, for instance the floater 104. The floater 104 is movable along a floater path, for instance the floater path 106, having the first end 142 associated with a low level of the fluid 105, and the second end 144 associated with a high level of the fluid 105.

Optionally, at step 404, the floater 104 is retained with a floater-retaining member, for example the floater retaining member 108. The floater-retaining member 108 can be disposed in the reservoir 102 in any suitable fashion. For instance, the floater-retaining member 108 can be fixedly or removably coupled to the reservoir 102. The floater-retaining member 108 can be a cylindrical member inserted through an axial bore of the floater 106, a hollow cylinder in which the floater 104 is inserted, or any other suitable member.

At step 406, a first circuit branch of a sensing circuit is formed, for example the circuit branch 220 of the sensing circuit 212. The circuit branch 220 extends along the floater path 106, and has a plurality of passive elements connected in series, for example the passive elements 226. The passive elements 226 are disposed between the first branch end 222 proximate to the first end 142 of the floater path 106, associated with the low fluid level, and the second branch end 224 opposite the first branch end 222.

At step 408, a second circuit branch of the sensing circuit 212 is formed, for example the circuit branch 230. The circuit branch 230 extends along the floater path 106, and has a plurality of switching elements connected together, for example the switching elements 236. The switching elements 236 are disposed between the first branch end 232 proximate to the first end 142 of the floater path 106 associated with the low fluid level, and the second branch end 234 opposite the first branch end 232. The switching elements 236 are also connected to the first circuit branch 220 between adjacent ones of the plurality of passive elements 226, and are configured for being actuated by movement of the floater 104.

At step 410, the second branch end 224 of the first circuit branch 220 is electrically coupled to the to the second branch end 234 of the second circuit path 230. The second ends 224, 234 can be coupled in any suitable fashion. At step 412, first and second sensing terminals, for example sensing terminals 228, 238, are disposed at the first branch end 222 of the first circuit branch 220 and the first branch end 232 of the second circuit branch 230, respectively. The sensing terminals 228, 238 are disposed proximate the first end 142 of the floater path 106, which is associated with the low fluid level. Optionally, at step 414, sensing leads, for example the sensing leads 152, can be electrically coupled to the first and second sensing terminals 228, 238.

In some embodiments, the method 400 can form part of a method for sensing a fluid level in a reservoir, for instance the reservoir 102. After performing the steps of the method 400, a fluid level of the fluid 105 within the reservoir 102 can be sensed via the sensing terminals 228, 238, which are arranged proximate the first end 142 of the floater path 106, which is associated with the low fluid level. The fluid level of the fluid 105 within the reservoir 102 is based on the actual value of the passive elements 226 as sensed from the sensing terminals 228, 238.

The various components of the sensing circuit 212 can be disposed at any suitable location, including within the reservoir 102, for instance on an inner wall thereof, coupled to the floater-retaining member 108, or outside the reservoir 102, for instance on an outer wall thereof.

Figure 5:
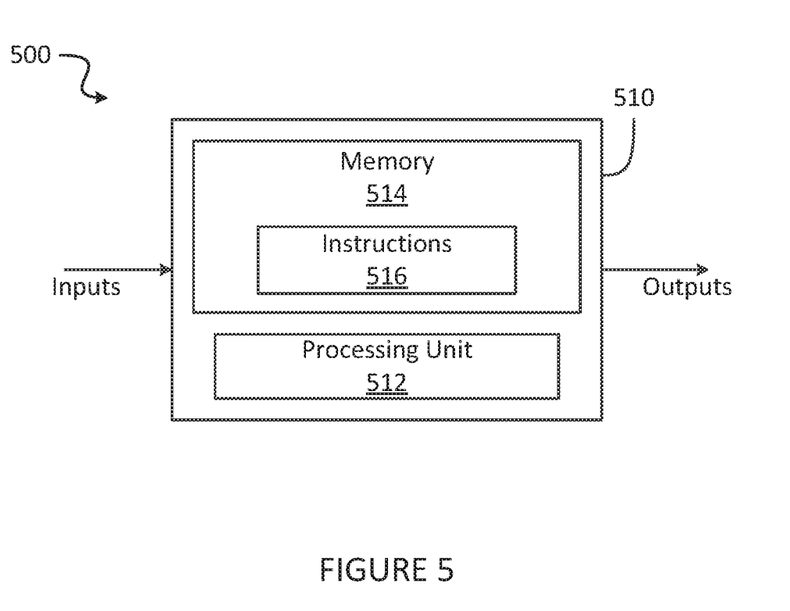
FIG. 5 is block diagram of an example computing device for implementing a detector used with the fluid level sensors of FIGS. 1 and 2, in accordance with an illustrative embodiment.

With reference to FIG. 5, the detector 150 may be embodied by a computing device 510 configured for measuring the level of fluid 105 in the reservoir 102. The computing device 510 comprises a processing unit 512 and a memory 514 which has stored therein computer-executable instructions 516. The processing unit 512 may comprise any suitable devices configured to implement the functionality of the detector 150 such that instructions 516, when executed by the computing device 510 or other programmable apparatus, may cause the functions/acts/steps performed by the detector 150 as described herein to be executed. The processing unit 512 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, custom-designed analog and/or digital circuits, or any combination thereof.

The memory 514 may comprise any suitable known or other machine-readable storage medium. The memory 514 may comprise non-transitory computer readable storage medium, for example, but not limited to, an electronic, magnetic, optical, electromagnetic, infrared, or semiconductor system, apparatus, or device, or any suitable combination of the foregoing. The memory 514 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 514 may comprise any storage means (e.g., devices) suitable for retrievably storing machine-readable instructions 516 executable by processing unit 512.

It should be noted that the computing device 510 may be implemented as part of a FADEC or other similar device, including electronic engine control (EEC), engine control unit (EUC), and the like. In addition, it should be noted that the techniques described herein can be performed by the detector 150 substantially in real-time.

The above description is meant to be exemplary only, and one skilled in the art will recognize that changes may be made to the embodiments described without departing from the scope of the present disclosure. Still other modifications which fall within the scope of the present disclosure will be apparent to those skilled in the art, in light of a review of this disclosure.

Various aspects of the systems and methods described herein may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be apparent to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A fluid level sensor, comprising:
a floater movable along a floater path in response to changes in a fluid level, the floater path having a first end associated with a low fluid level and an opposite second end associated with a high fluid level; and
a sensing circuit disposed along the floater path, comprising:
a first circuit branch extending along the floater path and having a first branch end and a second branch end, the first branch end having a first sensing terminal arranged proximate to the first end of the floater path associated with the low fluid level;
a second circuit branch extending along the floater path and having a third branch end and a fourth branch end, the third branch end having a second sensing terminal, separate from the first sensing terminal, arranged proximate to the first end of the floater path associated with the low fluid level, the fourth branch end electrically coupled to the second branch end of the first circuit branch and arranged proximate to the second end of the floater path associated with the high fluid level;
a plurality of passive elements connected in series along the first circuit branch between the first branch end and the second branch end; and
a plurality of switching elements each connected in parallel between the second circuit branch and the first circuit branch at connection points along the first circuit branch between pairs of adjacent passive elements, the switching elements configured for being actuated by movement of the floater, the fluid level read by the fluid level sensor corresponding to a lowest positioned actuated one of the switching elements with respect to the first end of the floater path to prevent overestimating of the fluid level, wherein the fluid level read by the fluid level sensor is lower than an actual fluid level of the reservoir when the lowest positioned actuated one of the switching elements is short-circuited and a given one of the switching elements, positioned above the lowest positioned actuated one of the switching elements with respect to the first end of the floater path, is actuated by the floater at the actual fluid level.

2. The fluid level sensor of claim 1, further comprising first and second sensing leads coupled to the first and second sensing terminals, respectively, and extending toward the second end of the floater path associated with the high fluid level.

3. The fluid level sensor of claim 1, further comprising a detector coupled to the first and second sensing terminals for determining the fluid level by sensing an actual value of the passive elements.

4. The fluid level sensor of claim 1, wherein the floater comprises a magnetic element, and wherein the plurality of switching elements are magnetically-switched elements.

5. The fluid level sensor of claim 1, wherein the floater comprises a light-producing element, and wherein the plurality of switching elements are optically-switched elements.

6. The fluid level sensor of claim 1, wherein the plurality of passive elements comprises a plurality of resistors.

7. The fluid level sensor of claim 1, wherein the plurality of passive elements comprises a plurality of capacitors.

8. The fluid level sensor of claim 1, wherein the plurality of passive elements comprises a plurality of inductors.

9. The fluid level sensor of claim 1, wherein the switching elements are closed when proximate to the floater.

10. The fluid level sensor of claim 1, further comprising a floater-retaining member, and wherein the sensing circuit is coupled to the floater-retaining member.

11. The fluid level sensor of claim 10, wherein the floater is movable along an outside surface of the floater-retaining member.

12. The fluid level sensor of claim 10, wherein the floater is movable within a hollow cavity formed within the floater-retaining member.

13. A method for sensing a fluid level in a reservoir having a bottom end associated with a low fluid level and a top end associated with a high fluid level, the method comprising:
disposing, within the reservoir, a fluid level sensor having a floater and a sensing circuit, the floater movable along a floater path in response to changes in the fluid level, the floater path extending between the bottom end and the top end of the reservoir, the sensing circuit having a plurality of sensing elements extending between the bottom end and the top end of the reservoir and a pair of sensing terminals having a sensing perspective to perform measurements from the bottom end of the reservoir to the top end of the reservoir; and
sensing the fluid level by reading the fluid level from a lowest positioned actuated one of the sensing elements with respect to the bottom end of the reservoir, to prevent overestimating of the fluid level, wherein the fluid level read is lower than an actual fluid level of the reservoir when the lowest positioned actuated one of the sensing elements is short-circuited and a given one of the sensing elements, positioned above the lowest positioned actuated one of the sensing elements with respect to the bottom end of the reservoir, is actuated by the floater at the actual fluid level.

14. The method of claim 13, wherein disposing the fluid level sensor within the reservoir comprises retaining the floater within the fluid reservoir with a floater-retaining member.

15. The method of claim 14, wherein retaining the floater within the fluid reservoir with a floater-retaining member comprises retaining the floater within a hollow cavity of the floater-retaining member.

16. The method of claim 14, wherein retaining the floater within the fluid reservoir with a floater-retaining member comprises inserting the floater-retaining member through an axial bore of the floater.

17. The method of claim 14, wherein disposing the fluid level sensor within the reservoir comprises forming the sensing circuit on the floater-retaining member.

18. The method of claim 13, wherein disposing the fluid level sensor within the reservoir comprises forming the sensing circuit on an inner wall of the reservoir.

19. The method of claim 13, further comprising electrically coupling a pair of sensing leads to the pair of sensing terminals.

20. A fluid reservoir, comprising:
a reservoir structure defining a storage chamber for receiving a fluid and having a top end associated with a high fluid level and a bottom end associated with a low fluid level; and a fluid level sensor disposed within the reservoir structure and having a floater and a sensing circuit, the floater movable along a floater path in response to changes in the fluid level, the floater path extending between the bottom end and the top end of the reservoir, the sensing circuit having a plurality of sensing elements extending between the bottom end and the top end of the reservoir and a pair of sensing terminals having a sensing perspective to perform measurements from the bottom end of the reservoir to the top end of the reservoir, wherein the fluid level read by the fluid level sensor corresponds to a lowest positioned actuated one of the sensing elements with respect to the bottom end of the reservoir structure to prevent overestimating of the fluid level, wherein the fluid level read by the fluid level sensor is lower than an actual fluid level of the reservoir when the lowest positioned actuated one of the sensing elements is short-circuited and a given one of the sensing elements, positioned above the lowest positioned actuated one of the sensing elements with respect to the bottom end of the reservoir, is actuated by the floater at the actual fluid level.

* * * * *